F. G. BIRCHARD.
SPRING WHEEL.
APPLICATION FILED DEC. 30, 1916.
1,245,661.
Patented Nov. 6, 1917.
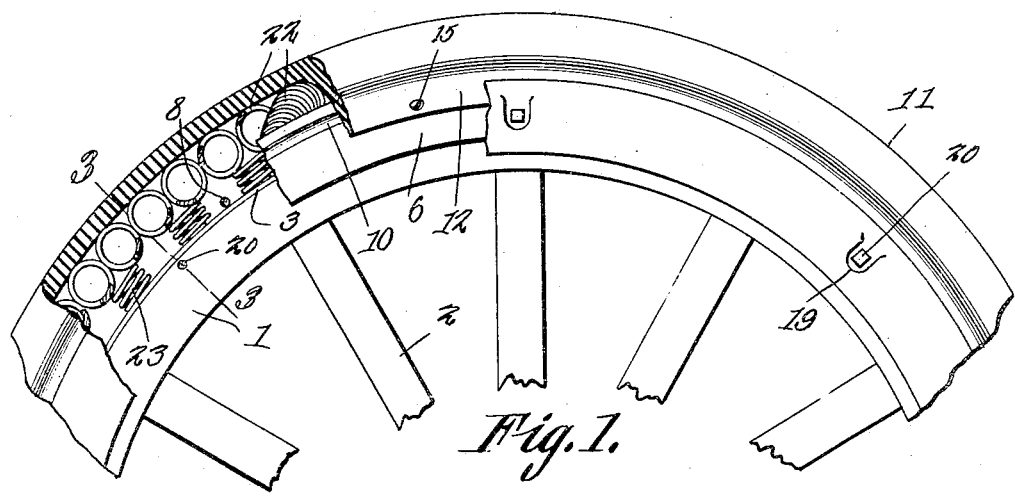
Fig. 1.
Fig. 2.
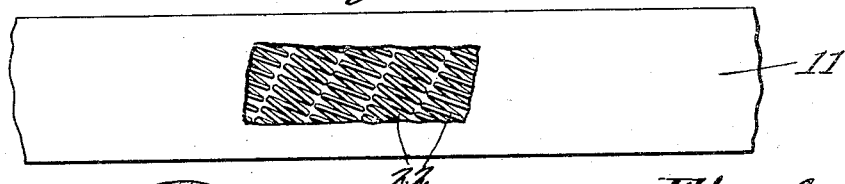
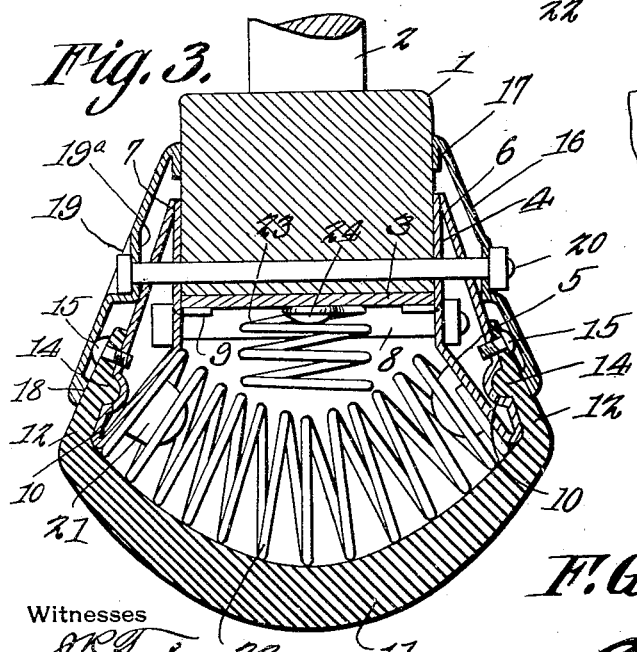
Fig. 3.
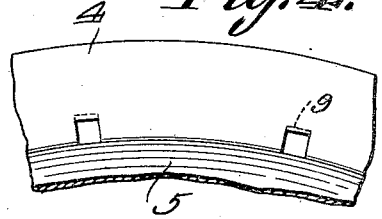
Fig. 4.
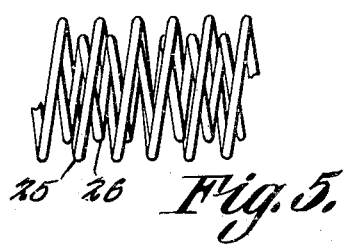
Fig. 5.
Witnesses
F. G. Birchard
Inventor,
by
Attorneys.

UNITED STATES PATENT OFFICE.

FORD G. BIRCHARD, OF LEWISBURG, PENNSYLVANIA.

SPRING-WHEEL.

1,245,661.   Specification of Letters Patent.   Patented Nov. 6, 1917.

Application filed December 30, 1916. Serial No. 139,868.

*To all whom it may concern:*

Be it known that I, FORD G. BIRCHARD, a citizen of the United States, residing at Lewisburg, in the county of Union and State of Pennsylvania, have invented a new and useful Spring-Wheel, of which the following is a specification.

The device forming the subject matter of this application is a tire, and one object of the invention is to improve the spring construction of the tire, and to provide novel means for connecting the spring portion of the tire with the rim of the wheel.

Another object of the invention is to provide novel means for holding the tread in place on the springs.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of a wheel equipped with the device forming the subject matter of this application, parts being broken away;

Fig. 2 is a fragmental top plan of a tire constructed in accordance with the present invention, parts being broken away, and the view being diagrammatic in nature;

Fig. 3 is a cross section taken approximately on the line 3—3 of Fig. 1;

Fig. 4 is a fragmental elevation showing a portion of the outer face of one of the side members; and Fig. 5 is a diagrammatic plan showing a modified form of the invention.

The numeral 1 indicates a felly carried by spokes 2. The felly 1 is surrounded by a rim band 3 which preferably is made of metal. The invention comprises a pair of annular inner side members, each including a base 4, an outwardly flaring wing 5 connected with the outer edge of the base 4, and a flange 6 which extends back toward the center of the wheel, the inner edges of the flanges 6 abutting against the inner edges of the base portions 4 of the side members, as shown at 7. Securing devices 8 connect the base portions 4 of the side members, outwardly of the rim band 3. The securing devices 8 may be bolts. Lugs 9 are struck from the base portions 4 of the side members and coact with the outer surface of the rim band 3 to aid in holding the side members in place. In the flanges 6, circumferential grooves or recesses 10 are formed.

The numeral 11 denotes an arched tread, which may be made of rubber, leather or any other suitable material. The tread 11 has flanges 12 which overlap the outer faces of the flanges 6 of the side members, the flanges 12 having circumferential ribs 14 received in the recesses 10. The flanges 12 of the tread 11 may be secured to the flanges 6 of the side members by means of attaching elements 15.

Laterally sloping annular side plates 16 are provided, the same being bent at their inner edges to form parallel feet 17 bearing against the sides of the felly 1, like the base portions 4 of the inner side members. The outer side plates 16 are provided at their peripheries with circumferential ribs 18 bearing against the outer faces of the flanges 12 of the tread 11, to hold the ribs 14 in the recesses 10. The outer side plates 16 preferably are somewhat resilient and are provided at intervals with recesses 19 having flat parallel bases $19^a$. Securing elements, which may be bolts 20, have their extremities engaged with the flat bases $19^a$ of the recesses 19 in the side plates 16, and pass through the flanges 6, the base portions 4 of the inner side members and through the felly 1.

The wings 5 of the inner side members are supplied with lugs 21 receiving the ends of springs 22, the springs 22 preferably being of helical form. The axes of the springs 22 are disposed at acute angles to the median plane of the wheel, as Fig. 2 will render evident. This construction enhances the resiliency of the wheel and avoids any bumping action as the wheel operates. The invention comprises any desired number of radially disposed helical springs 23 secured as shown at 24 to the rim band 3, the outer ends of the springs 23 being adapted to coact with the transverse helical springs 22, in a manner which will be understood clearly from the drawings. The springs 23 may be omitted if desired.

In the modified form shown in Fig. 5 of the drawings, the numeral 25 designates a spring corresponding to the spring 22. Within the spring 25 is placed a smaller helical spring 26. The double spring construction shown in Fig. 5 will be found useful on heavy cars, but its employment is not mandatory.

Having thus described the invention, what is claimed is:—

In a device of the class described, a felly; inner side members abutting against the felly and projecting outwardly beyond the felly; transverse springs engaged terminally with the outwardly projecting portions of the inner side members; a tread coacting with the springs and provided with flanges overlapping the exterior faces of the side members; outer side plates abutting against the felly and abutting against the flanges of the tread; and means for securing the side members and the side plates to the felly.

In testimony that I claim the foregoing as my own, I have hereto affixed my signature in the presence of two witnesses.

FORD G. BIRCHARD.

Witnesses:
R. A. BIRCHARD,
H. M. SHOWALTER.

Copies of this patent may be obtained for five cents each, by addressing the "Commissioner of Patents, Washington, D. C."